United States Patent [19]
Gijsbers et al.

[11] 3,977,364
[45] Aug. 31, 1976

[54] APPARATUS FOR EVAPORATING LIQUIDS

[75] Inventors: Josephus Cornelis Wilhelmus Franciscus Gijsbers, Eindhoven, Netherlands; Hans Heinrich Otto Oskar Hermann Uhlemann, Augsburg, Germany

[73] Assignee: U.S. Philips Corporation, New York, N.Y.

[22] Filed: Feb. 27, 1974

[21] Appl. No.: 446,147

[30] Foreign Application Priority Data
Mar. 6, 1973   Netherlands...................... 7303078

[52] U.S. Cl.............................. 122/366; 165/105; 159/1 W; 159/5; 159/27 D; 261/107
[51] Int. Cl.²..................... F28D 15/00; F22B 37/00
[58] Field of Search.................. 261/104, 107, 154; 122/366; 159/1 W, 5, 23, 27 R, 27 D; 62/315, 316; 165/105

[56] References Cited
UNITED STATES PATENTS

| | | | |
|---|---|---|---|
| 1,602,890 | 10/1926 | Evans | 62/316 X |
| 1,836,193 | 12/1931 | Silvers | 261/104 |
| 1,898,785 | 2/1933 | Murdoch et al. | 261/104 X |
| 2,166,193 | 7/1939 | Woodworth | 122/366 X |
| 3,344,979 | 10/1967 | Chester | 122/366 X |

*Primary Examiner*—Albert W. Davis, Jr.
*Attorney, Agent, or Firm*—Frank R. Trifari; J. David Dainow

[57] ABSTRACT

Apparatus for evaporating liquids, including means to form the liquid into a thin film on a heatable wall, the means comprising a porous layer having a first portion which covers the wall concerned and at the top of the wall passes via a bend into a second portion which is spaced from the first portion and is surrounded by a liquid-receptacle.

10 Claims, 9 Drawing Figures

APPARATUS FOR EVAPORATING LIQUIDS

BACKGROUND OF THE INVENTION

The invention relates to an apparatus for evaporating liquids which comprises at least one heatable wall and means for distributing the liquid concerned over the said wall in the form of a thin film. Such apparatus may be used in industry, for example, in systems in which for the transfer of heat, a liquid is evaporated at one location (evaporator) and then is condensed at another location (condenser). Owing to the good heat transfer during evaporation and condensation, the heat transfer areas required are small. Furthermore the temperature losses and the circulating amount of the heat transfer medium are small. The latter facts have the advantage that circulating the medium requires only little power.

Since the temperatures at which the processes occur in chemical processing technology and also in engines generally are very high, the temperature level at which the aforementioned heat transfer is effected must be high also. At these high temperatures of more than 500°C, metallic heat carriers (for example Na and K) are suitable, because they are capable of withstanding these temperatures and have low vapor pressures. However, a disadvantage is that boiling of these liquids is retarded by their high surface tension and the small increase of their vapor pressure with temperature. This gives rise to undesirable fluctuations of the temperature and the pressure. To avoid these disadvantages, it is known to convey such liquids in the form of a thin film over a heated surface so that evaporation at the film surface takes place substantially without overheating.

At the very high temperatures the distribution of the liquid over the heated surface gives rise to difficulty. At low temperatures the thickness of the layer of liquid is usually reduced by wipers or rotating rollers. For technological reasons, it is difficult to use these methods at elevated temperatures. Furthermore down-flow (fall-stream) evaporators are known in which the liquid is distributed over a wall from the top thereof to flow down the wall. However, it is very difficult to obtain undisturbed layers of even thickness.

It is an object of the present invention to obviate the aforementioned problems.

SUMMARY OF THE INVENTION

The apparatus according to the invention is characterized in that means are provided having the form of a porous layer, a first portion of which covers the wall concerned and at the top passes via a bend into a second layer portion which is spaced from the first portion and is surrounded by a receptacle into which a supply for the liquid to be evaporated opens.

In the apparatus according to the invention said porous layer draws up liquid from the receptacle and distributes it over the heated wall in the form of an even undisturbed film. Thus the porous layer acts as a siphon.

The amount of liquid drawn up adapts itself to the amount of liquid supplied to the receptacle by variation of the level of the liquid in the receptacle. In the steady state the amount of liquid drawn up from the receptacle is equal to the amount supplied to it. Thus a highly satisfactory distribution of the liquid over the wall is ensured by simple means. The operation will be set out more fully hereinafter with reference to the drawings.

In another favourable embodiment of the apparatus according to the invention the cross-sectional area of the said second portion of the porous layer increases towards the bend. According to the invention this is obtainable by forming the second portion of the layer with notches which taper towards the bend. The notches may for example be triangular. The aforementioned variation of the crosssectional area of the second layer portion ensures that the influence of the variation of the level of the liquid in the receptacle on the flow of liquid supplied to the wall increases. In other words, regulation of the flow of liquid supplied to the wall becomes more sensitive.

In a further advantageous embodiment of the apparatus according to the invention the porous layer comprises lengths of coarse-mesh gauze which are enclosed by a layer of finer-mesh gauze. Thus a siphon is obtained in which the flow of the liquid does not meet excessive resistance while owing to the fine-mesh gauze the capillary force is such as to enable the liquid to evaporate but not to flow out.

A further embodiment of the apparatus according to the invention is characterized in that the chamber in which the vapor is formed is connected via a vapor conduit to a condenser which via a condensate conduit is connected to the receptacle containing the liquid but is disposed at a level higher than the receptacle, the condensate conduit including a liquid-lock. Thus an apparatus is obtained in which the vapour formed transfers heat from the heatable wall to the condenser, the medium circulating without the use of pumping means. Furthermore in this apparatus a liquid level will automatically be set in the receptacle such that the flow of liquid supplied to the wall always corresponds to the amount of medium evaporated.

In still another advantageous embodiment of the apparatus according to the invention in which the liquid to be evaporated is a metal, for example sodium, the chamber in which the vapor is produced is connected via a vapor conduit to a condenser which, via a condensate conduit, is connected to a collecting vessel from which the condensate is supplied to the liquid-receptacle at a rate such that the amount supplied exceeds the amount evaporated. Thus in this apparatus, an excess of liquid is always supplied to the heatable wall. Owing to gravity this excess will flow out of the porous layer at the bottom. This has the advantage that no metal oxides can accumulate in the porous layer.

Such accumulation would give rise to corrosive attack on the porous layer and the wall of the evaporator. Causing an excess of liquid to flow through the porous layer ensures a long useful life of the apparatus.

BRIEF DESCRIPTION OF THE DRAWINGS

Embodiments of the invention will now be described, by way of example, with reference to the accompanying diagrammatic drawings.

DETAILED DESCRIPTION OF THE PREFERRED EMBODIMENTS

Figure 1:
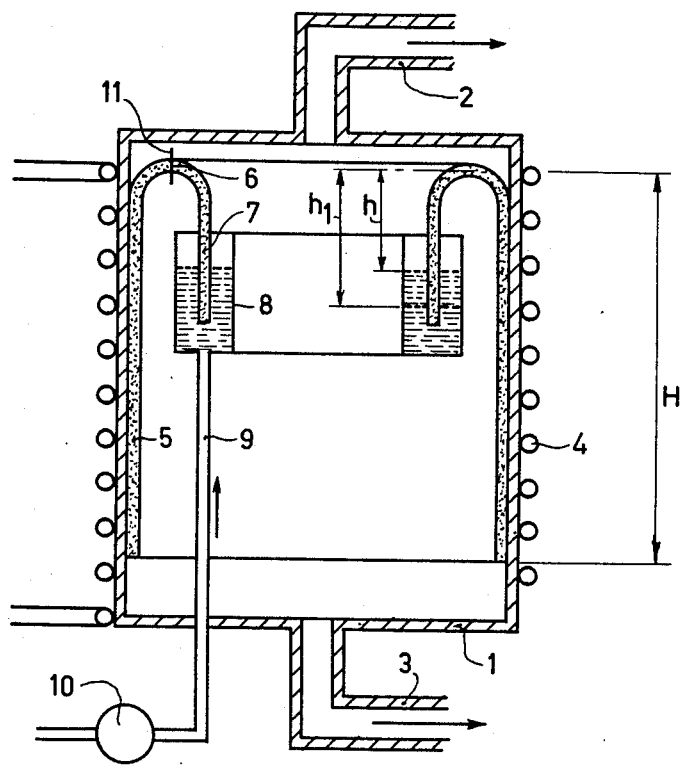
FIG. 1 shows schematically and not to scale an apparatus for evaporating liquids.

Referring now to FIG. 1, an evaporating chamber 1 is provided at the top with a vapor discharge duct 2 and at the bottom with a discharge duct 3 for any residual liquid. The chamber 1 is encircled by an electric heating helix 4. The inner surface of the wall of the chamber 1 is coated with a first porous layer portion 5 which via a bend 6 merges into a second porous layer portion 7 which extends parallel to the portion 5 and is surrounded by a liquid-receptacle 8. Liquid to be evaporated can be supplied to the receptacle 8 via a conduit 9 by a pump 10. The porous layer 5, 6, 7 comprises a plurality of layers of coarse-mesh gauze which are covered by fine-mesh gauze.

Operation of this apparatus is as follows: By passing electric current through the heating helix 4, heat is supplied to the wall of the chamber 1 and to the porous layer portion 5. Liquid to be evaporated is supplied to receptacle 8 via the conduit 9 by a pump 10. By capillary action the liquid in the receptacle 8 is drawn up in the porous layer portion 7 to the sectional plane 11 of the bend 6. From this area the liquid flows down through the layer portion 5 by gravity. Thus, the porous layer 7, 6, 5 acts as a siphon, the liquid being caused to flow in a thin even layer down the heated inner wall of the chamber 1 so that it is entirely or partially evaporated.

The balance of forces in the porous layer is given by the equation:

$$H\rho_F g - \Delta p_H = h\rho_F g + \Delta p_h,$$

where $H$ = height of the layer portion 5, $h$ = height of the layer portion 7 above the level of the liquid, $\rho F$ = specific gravity of the liquid, $g$ = gravity, and $P_H$ and $p_h$ are the losses in pressure in the portions 5 and 7 respectively due to the friction experienced by the liquid in the porous layer:

$$P_H = C.H. \left(\tfrac{m}{A}\right) \text{ and}$$

$$P_h = C.h. \left(\tfrac{m}{A}\right)$$

where $C$ = a constant, $A$ = the cross-sectional area of the porous layer available for liquid flow, and $m$ = inertial flow of the liquid.

Figure 2:
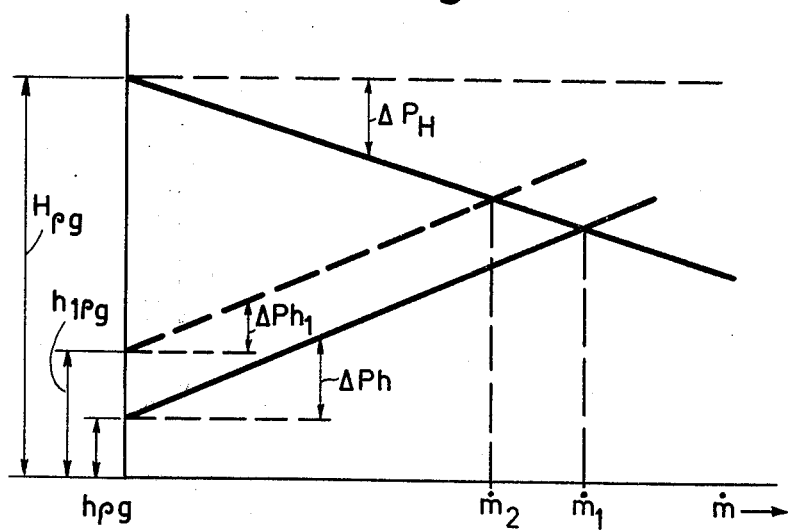
FIG. 2 is a graph showing the relationship between the pressure and the inertial flow of the liquid in the porous layer.

The above formulae are shown graphically in FIG. 2, from which it can be seen that the liquid travelling up the porous layer and the liquid flowing down the wall are balanced at $m_1$.

When the level of the liquid in the receptacle 8 falls to an extent such that the height $h$ changes to $h_1$, the pressure in the liquid travelling upwards will vary as the thick broken line $a'\ b'$ in FIG. 2. In this case the amount of liquid supplied is balanced by the amount of liquid discharged at an inertial flow $m_2$ which is smaller than $m_1$. This shows that by varying the level of the liquid in the receptacle 8 the amount of liquid which flows down the wall of the chamber 1 is automatically adapted to the amount which is evaporated.

In the case of very rapid variations in the vapor required or in the heat supplied it will be desirable for the amount of liquid supplied to be adapted at the highest possible rate. A possibility of high-rate adaptation is for the receptacle 8 to be narrow so that comparatively slight changes in the supply of liquid will rapidly bring about comparatively large changes in the level in the receptacle, i.e., variations of $h$.

Figures 3A, 3B:
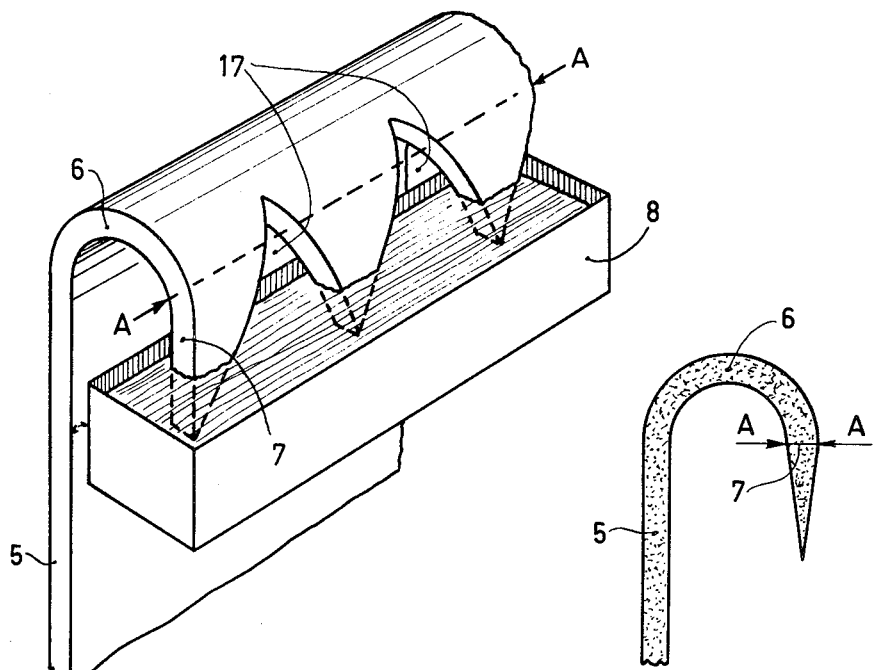
FIG. 3a shows the manner in which the porous layer may be provided with triangular notches.
FIG. 3b shows the decrease of the cross-sectional area of the porous layer beyond the bend.

A possibility of control at an even higher rate is for the cross-sectional area A of the layer portion 7 to decrease in a downward direction from the bend 6. This may be effected by a configuration as shown in FIG. 3a or in FIG. 3b, where the layer portion 7 tapers to a point beyond the bend, and the cross-sectional area of the layer portion 7 is decreased by the provision of triangular notches 17. A combination of the said configurations is also possible.

Figure 4:
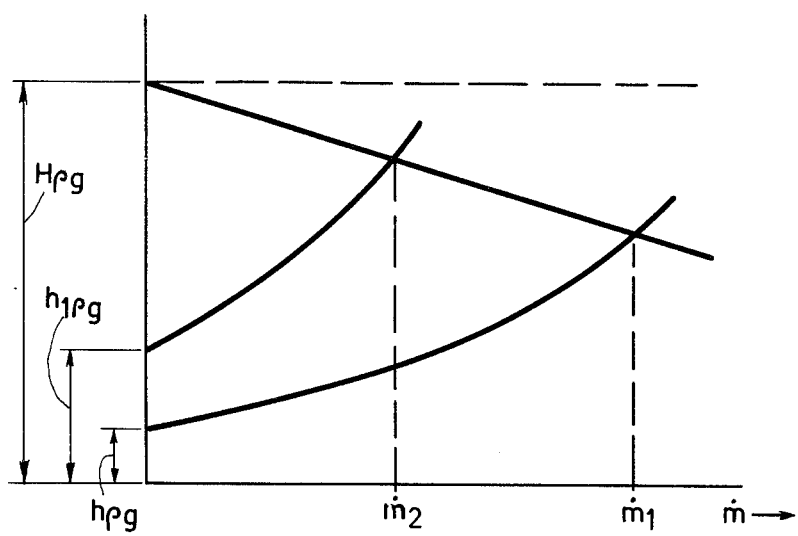
FIG. 4 is a graph showing the relationship between the pressure and the inertical flow of the fluid in the porous layer shown in FIG. 3.

With this variation of the cross-sectional area A of the layer portion 7, $\Delta p_h$ is varied both by variation of $h$ and by variation of A. The effect produced is shown in FIG. 4 from which it will be seen that with the same variation of $h$ to $h_1$ of the liquid level, the change in the flow of liquid from $m_1$ to $m_2$ at which a balanced condition is obtained, is far greater than in the situation illustrated in FIG. 2. Thus the supply of liquid can be adapted to have fluctuating operating conditions at a very high rate.

The evaporating apparatus shown in FIG. 1 may be used in chemical processing technology for concentrating substances by evaporation. The apparatus may also be used in systems in which an evaporating and condensing medium transfers heat. Such a system is shown schematically in FIG. 5, wherein the apparatus of FIG. 1, which is partly included, is denoted by the same reference numerals. The vapor discharge duct 2 connects the chamber 1 to a chamber 14 which accommodates a condenser structure 12, for example the heater of a hot-gas engine. The bottom of the chamber 1 is closed because no condensate is to be discharged, while a supply conduit 13 is provided for supplying a sufficient amount of medium to the apparatus. The chamber 14 is connected to the liquid-receptacle 8 by a condensate conduit 15. The conduit 15 includes a liquid-lock 16.

In operation the amount of medium available in the apparatus will be such that at the bottom of the chamber 1 liquid is present which wets the lower end of the layer portion 5. The system operates as follows: Here also heat is supplied to the wall of the chamber 1 via the heating helix 4. It should be noted that instead of by a heating helix, heat may be supplied in any other known manner, for example by means of a burner or a chemical heating system. As described hereinbefore, the heat supplied will evaporate liquid from the layer portion 5 and in the steady state an equal amount of liquid will be supplied from the receptacle 8.

The vapor passes through the duct 2 to the chamber 14, where it condenses on the condenser 12. Via the conduit 15 and the liquid-lock 16 the condensate flows back to the receptacle 8. The liquid-lock ensures that when the system is started no vapor can pass through this conduit. In operation a column of liquid is formed which ensures that flow towards the receptacle 8 occurs.

In the steady state the amount of vapor passing to the condenser is equal to the amount of liquid flowing to the receptacle 8. When the cooling power of the condenser 12 increases, the pressure in the chamber 14 falls so that the column of liquid in the conduit 15 rises. The liquid required for this purpose is withdrawn from the receptacle 8, so that the level of the liquid in it falls. This means that the porous layer 7, 6, 5 supplies a smaller amount of liquid to the wall. The amount of liquid supplied in this manner is too small for the initial condition and hence certainly for the required power increase. The deficiency of liquid is made up by the layer portion 5 which draws up liquid from the bottom part of the chamber 1. Thus the system readily adapts itself to power changes of the condenser.

If the system is to transfer heat at elevated temperatures, as is the case for example when the condenser is the heater of a hot-gas engine, metals such as Na or K are to be used as the medium. In this case at comparatively high oxygen concentrations, the porous layer and the wall of the chamber 1 are liable to be heavily attacked. The oxides are poorly volatile, which means that during evaporation they are left in the porous layer portion 5, where they accumulate so that the local oxygen concentration may exceed the permissible value. To avoid such accumulation, in the system shown in FIG. 6 condensate is returned from the chamber 14 via a discharge conduit 20 to a supply vessel 21. A conduit 22 including a pump 23 and a valve 24 is connected to the supply vessel 21. The pump 23 is by-passed by a conduit 25 which ensures that when the valve 24 is closed the liquid delivered by the pump can flow back to the supply vessel. The conduit 22 is connected to the lower end of the chamber 1. The lower end of the chamber 1 is also connected to the receptacle 8 via a duct 26 which includes a pump 27.

The pump 27 is adjusted so that it always supplies more liquid to the receptacle 8 than is evaporated from the porous layer. The excess liquid will flow out of the lower end of the layer portion 5 and carry along the non-evaporated oxides, preventing accumulation of these oxides in the layer portion 5.

Figure 5:
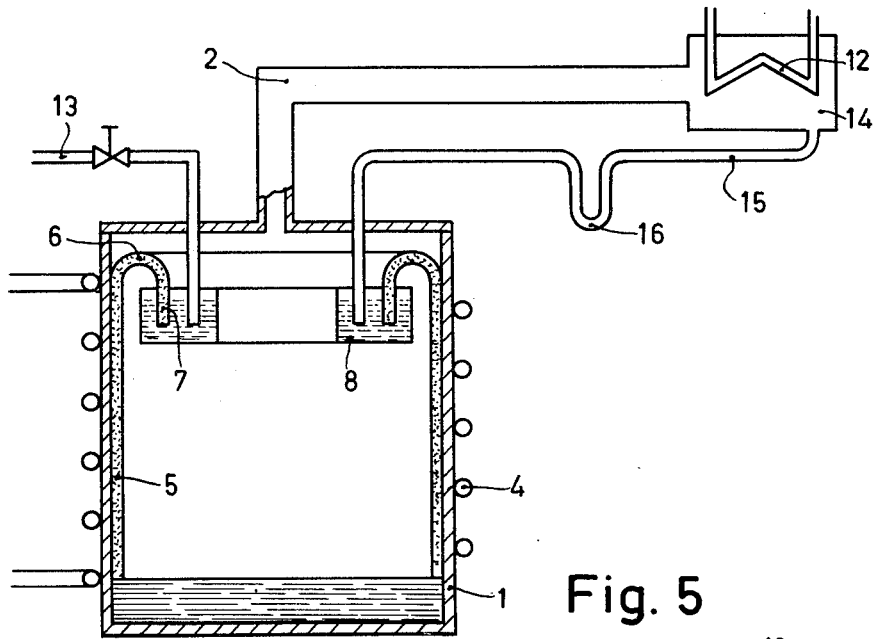
FIG. 5 shows an evaporating apparatus in which the vapor after passing a condenser flows back to the liquid-receptacle via a condensate conduit.
Figure 6:
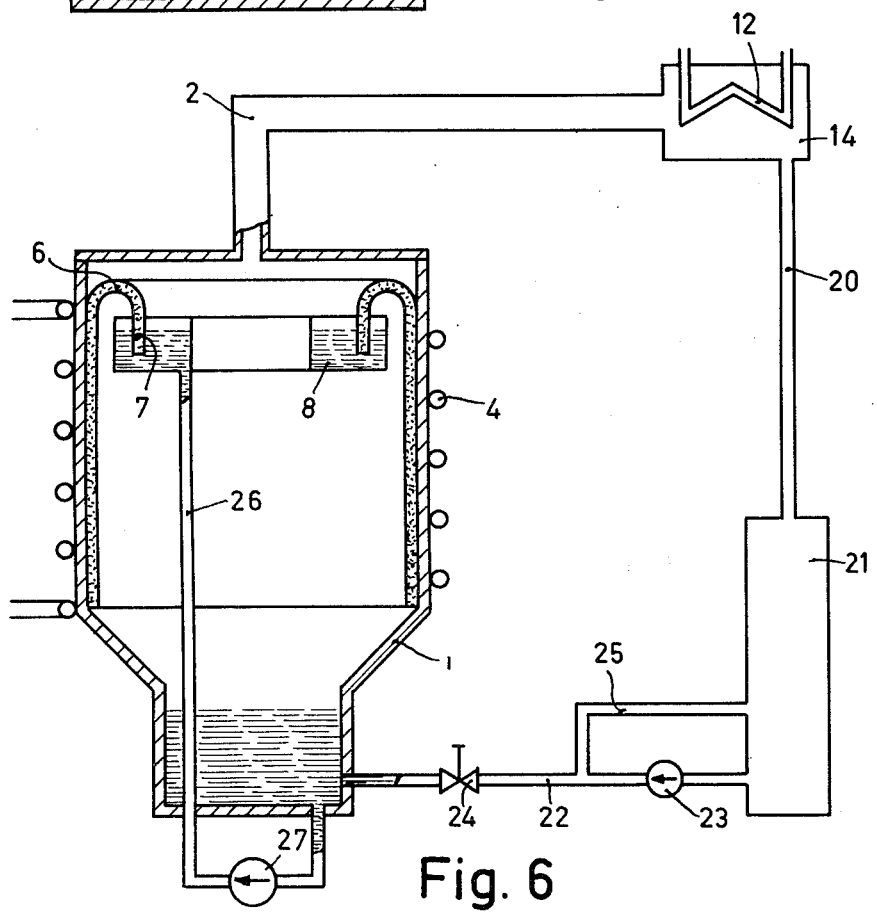
FIG. 6 shows an apparatus for evaporating sodium in which the sodium is circulated by means of pumps.
Figures 7, 8:
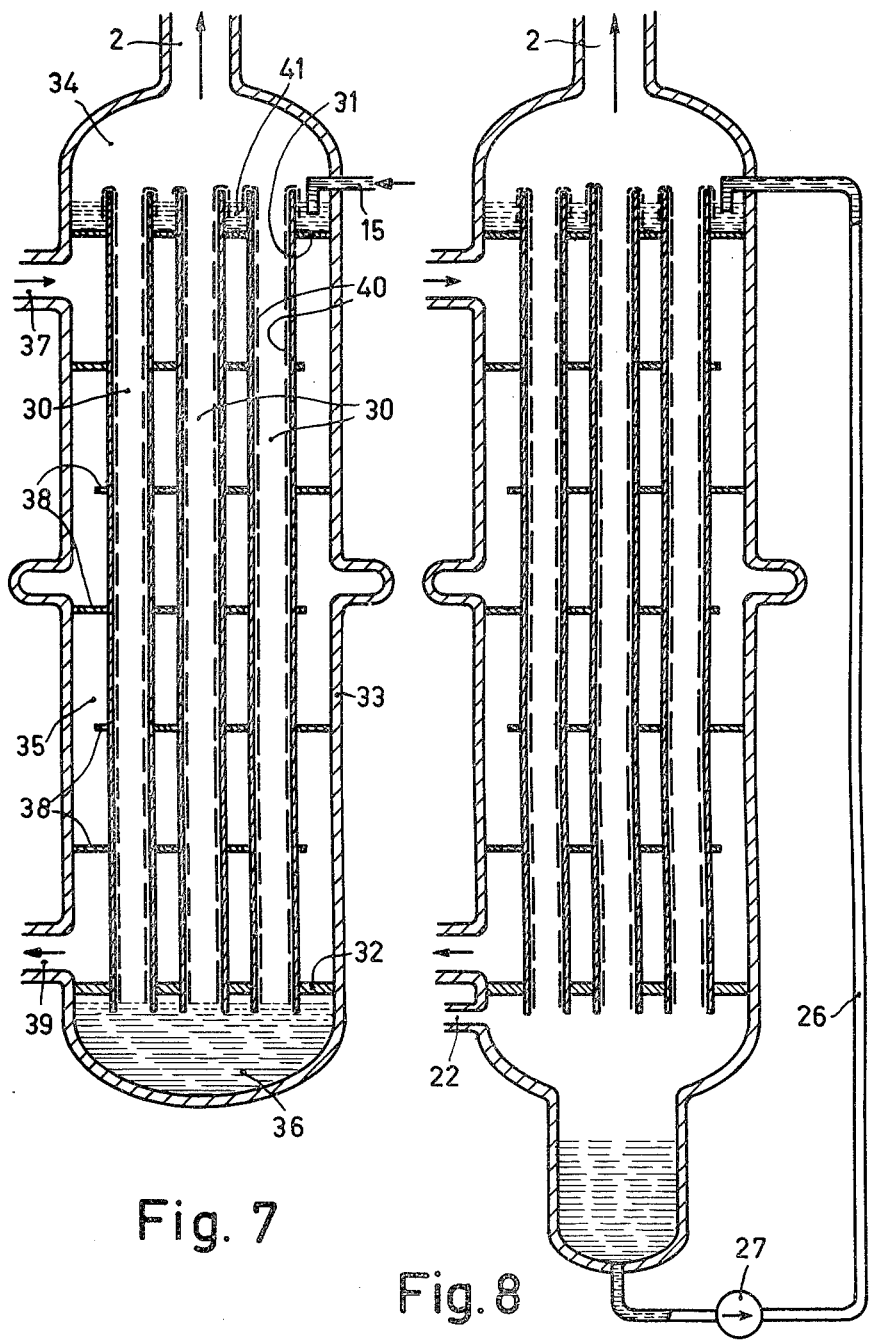

In the systems shown in FIGS. 5 and 6, an evaporator construction as shown in FIG. 1 employing electric heating is used. Other forms, for example as shown in FIGS. 7 and 8, may be used instead. In these Figures the evaporator comprises a plurality of pipes 30 which at their upper and lower ends are mounted in plates 31 and 32 respectively. These plates 31 and 32 divide a tank 33 into a vapour chamber 34, a heating chamber 35 and a condensate chamber 36. To the heating chamber is connected a supply conduit 37 for hot combustion gases which are guided by baffle plates 38 through the chamber 35 along the outer surfaces of the pipes 30 to a discharge duct 39.

Each pipe 30 is internally coated with a porous layer 40 which at the top is bent over the pipe rim so as to dip into condensate contained in a receptacle 41. The liquid drawn up from the receptacle 41 by the porous layer 40 is evaporated in the pipes 31, the vapor flowing to the condenser via the discharge duct 2. Condensate flows back to the receptacle 41 via the conduit 15. In the evaporator shown in FIG. 8 condensate is returned via the conduit 22 and the conduit 26 including the pump 27.

What is claimed is:
1. In an apparatus for evaporating a liquid including a housing formed by walls, heating means for heating at least one of said walls and a receptacle in said housing for containing said liquid, the improvement in combination therewith of means for distributing said liquid into a thin film to be heated on said heatable wall and evaporated, comprising: a porous layer operable with said liquid as a capillary material, said layer comprising a first upward-extending part on said wall and having upper and lower ends, a second upward-extending part spaced from the first part and having an upper end, and a lower end in said receptacle for contacting liquid therein, and a third part which is curved and interconnects said two upper ends of said first and second parts, said second part having cross-sectional area which decreases from the top end thereof at the junction with said third part downwardly toward its bottom end.

2. Apparatus according to claim 1 wherein said second part includes generally V-shaped notches for forming said decreasing cross-sectional area.

3. Apparatus according to claim 1 wherein said porous layer comprises coarse-mesh gauze surrounded by finer-mesh gauze.

4. Apparatus according to claim 1 wherein said second part is tapered and becomes thinner in both width and thickness in the downward direction.

5. Apparatus according to claim 1 wherein said heating means comprises duct means for flowing hot-gas into thermal contact with said wall.

6. In an apparatus for evaporating a liquid including a housing, a receptacle in said housing for containing said liquid, the improvement in combination therewith of means for distributing said liquid into a thin-film to be heated and evaporated, comprising: a porous layer carried by said housing and operable with said liquid as a capillary material, said layer comprising a first upward-extending part having upper and lower ends, a second upward-extending part spaced from the first part and having an upper end, and a lower end in said receptacle for contacting liquid therein, and a third part which is curved and interconnects said two upper ends of said first and second parts, said second part having crosssectional area which decreases from the top end thereof at the junction with said third part downwardly toward its bottom end.

7. Apparatus according to claim 6 wherein said second part includes generally V-shaped notches for forming said decreasing cross-sectional area.

8. Apparatus according to claim 6 wherein said porous layer comprises coarse-mesh gauze surrounded by finer-mesh gauze.

9. Apparatus according to claim 6 wherein said second part becomes thinner in both width and thickness in the downward direction.

10. In an apparatus for evaporating a liquid, the apparatus including a housing, a receptacle in said housing for containing said liquid, at least one upright tube within said housing, the tube having top and bottom ends and inner and outer wall surfaces, the improvement in combination therewith of means for distributing said liquid into a thin film to be heated, comprising a layer of porous material operable with said liquid as a capillary material, said layer comprising first and second parts, the second part situated on the inner walls of said tube along the length thereof between said top and bottom ends, the first part situated on the outer walls of the tube and extending from said top end downward to said receptacle, said first part having cross-sectional area which decreases in the downward direction from said top part toward said receptacle, and a third curved part interconnecting said first and second parts at the top end of said tube, and duct means for flowing heated gas through said housing past said outer walls of the tube for heating said walls and said layer of porous material on the inner walls thereof.

* * * * *